US008078178B2

United States Patent
Islam et al.

(10) Patent No.: US 8,078,178 B2
(45) Date of Patent: Dec. 13, 2011

(54) METHOD AND APPARATUS TO RESTORE ALWAYS-ON CONNECTIVITY DURING NETWORK HANDOVER

(75) Inventors: Muhammad Khaledul Islam, Ottawa (CA); Jeffrey Wirtanen, Ottawa (CA); Jean-Philippe Cormier, Ottawa (CA); Dimitrios Prodanos, ottawa (CA)

(73) Assignee: Research in Motion Limited, Waterloo (CA)

( * ) Notice: Subject to any disclaimer, the term of this patent is extended or adjusted under 35 U.S.C. 154(b) by 467 days.

(21) Appl. No.: 11/377,181

(22) Filed: Mar. 17, 2006

(65) Prior Publication Data

US 2007/0218911 A1 Sep. 20, 2007

(51) Int. Cl.
*H04W 40/00* (2009.01)
(52) U.S. Cl. ........ 455/445; 370/329; 370/330; 370/331; 370/332; 370/333; 370/352; 370/353; 370/354; 370/355; 370/356; 370/254; 445/436; 445/437; 445/438; 445/439; 445/440; 445/441; 445/442; 445/443; 445/444; 445/552.1; 445/452.1
(58) Field of Classification Search .................. 455/436, 455/437, 438, 439, 440, 441, 442, 443, 444, 455/445, 452.1, 552.1; 370/329, 330, 331, 370/332, 333, 338, 352, 353, 354, 355, 356, 370/254
See application file for complete search history.

(56) References Cited

U.S. PATENT DOCUMENTS

| | | | |
|---|---|---|---|
| 6,771,964 B1 | 8/2004 | Einola et al. | |
| 6,819,659 B1 * | 11/2004 | Palat et al. | 370/331 |
| 6,963,745 B2 * | 11/2005 | Singh et al. | 455/437 |
| 7,274,935 B2 * | 9/2007 | Balachandran et al. | 455/437 |
| 7,400,885 B2 * | 7/2008 | Bakri | 455/436 |
| 7,502,362 B1 * | 3/2009 | Koskinen et al. | 370/352 |
| 2003/0169725 A1 * | 9/2003 | Ahmavaara et al. | 370/352 |
| 2004/0203780 A1 * | 10/2004 | Julka et al. | 455/436 |
| 2005/0003819 A1 * | 1/2005 | Wu | 455/436 |
| 2005/0265279 A1 * | 12/2005 | Markovic et al. | 370/328 |
| 2005/0266853 A1 * | 12/2005 | Gallagher et al. | 455/439 |
| 2006/0256752 A1 * | 11/2006 | Svensson et al. | 370/331 |

FOREIGN PATENT DOCUMENTS

| | | |
|---|---|---|
| EP | 1079656 | 2/2001 |
| EP | 1494494 | 1/2005 |

OTHER PUBLICATIONS

"3rd Generation Partnership Project; Technical Specification Group Core Network and Terminals; Mobile radio interface Layer 3 specification; Core network protocols; Stage 3 (release 7)" 3GPP TS 24.008 V7.2.0, Dec. 2005, pp. 94-140, XP002399927.

* cited by examiner

*Primary Examiner* — Rafael Pérez-Gutiérrez
*Assistant Examiner* — Liton Miah
(74) *Attorney, Agent, or Firm* — Moffat & Co.

(57) ABSTRACT

A method and apparatus to restore always on connectivity to user equipment, the method having the steps of: monitoring whether the user equipment has transitioned to a network that supports concurrent voice and data; performing, upon the monitoring step detecting the transition, a routing area update; checking whether the user equipment was in a voice call at the time of the transition, and if yes, sending a data packet to the network.

18 Claims, 7 Drawing Sheets

METHOD AND APPARATUS TO RESTORE ALWAYS-ON CONNECTIVITY DURING NETWORK HANDOVER

FIELD OF THE DISCLOSURE

The present disclosure relates to always-on mobile stations in 3GPP networks and in particular to procedures for transitioning user equipment between a network that does not support concurrent voice and data to a network that does support concurrent voice and data.

BACKGROUND

Always-on user equipment is expected to maintain packet data connectivity at all times and to always be reachable for push services. Further, the always-on user equipment must ensure that packet data protocol (PDP) contexts associated with its most important applications are maintained.

Data connectivity may however not be always automatically maintained or restored after a dual mode UE, that supports GSM and UMTS, performs a GSM to UMTS reselection or handover. More generally, data connectivity may not be maintained when the dual mode UE transitions between any network that does not support concurrent voice and data to a network that does support concurrent voice and data.

In the above-described transition, there may not be any instant trigger to cause signaling communication with the network, such as a change in location area code/routing area code (LAC/RAC). There may also be no outbound user data on the user equipment that would force the user equipment to send a routing area update message in case there was a RAC change. Such signaling messages are required to maintain or initiate restoration of PDP context.

In the case of the user equipment being in a voice call during a transition, a packet session that was suspended when the call was initiated in GSM or handed over to GSM may not resume until the voice call ends in UMTS. In this case, the user equipment will not be reachable from a packet data perspective even after it has entered a network that supports concurrent voice and data.

Further, if the user equipment performs a cell reselection from GSM to UMTS within the same routing area, according to 3GPP specifications (TS 24.008) there is no need to do an update if the UE is in packet mobility management (PMM) idle mode in UMTS until up-link user data or signaling information needs to be sent from the MS to the network, In addition, although 3GPP specifications (TS 24.008) indicate that after the successful completion of the handover from an GSM cell to an UMTS cell, a UE shall perform a normal RA update procedure in the UMTS cell in order to resume the GPRS services in the network before sending any other signaling messages or user data, 3GPP specifications do not mention when such update should take place. In such situations, if an always-on UE does not perform such update immediately after GSM to UMTS idle reselection or active voice call handover, UE may not be available from the perspective of push servers.

It is quite possible that the number of concurrent primary PDP contexts supported by a UMTS network is different from the number of concurrent primary PDP contexts supported by the GPRS network. For example, currently most UMTS networks support only one or in some cases a maximum of two concurrent primary PDP contexts, whereas GPRS networks support more than that. An always-on device needs to restore its most important PDP context such a context associated with its the push APN (access point name) context as soon as concurrent voice and packet data services are available.

A BRIEF DESCRIPTION OF THE DRAWINGS

The present disclosure will be better understood with reference to the drawings in which.

DETAILED DESCRIPTION

The present method and apparatus provide for always-on user equipment (UE) to maintain packet data connectivity at all times. According to the present method and apparatus, a UE performs a routing area update with PDP context status information as soon as a GSM to UMTS handover or reselection is complete, regardless of whether the UE is made aware of a routing area change or a location area change or even if there is no change in the routing area code or location area code.

The method and apparatus of the present disclosure further provide for the sending of a small packet to always-on push servers right after the handover of a voice call. Outbound data forces the mobile to send a routing area update request prior to actual data exchange. By doing so, the UE finds out if there is any change in existing PDP contexts such as the number of PDP contexts supported by the network, IP address and restores its preferred PDP contexts if required.

The present disclosure therefore provides a method to restore always on connectivity to user equipment, the method comprising the steps of: monitoring whether the user equipment has transitioned to the network that supports concurrent voice and data; and performing, upon said monitoring step detecting the transition, a routing area update.

The present disclosure further provides always-on user equipment adapted to restore always-on connectivity during network handover, the user equipment having a radio subsystem including a radio adapted to communicate with the mobile network; a radio processor having a digital signal processor and adapted to interact with said radio subsystem; memory; a user interface; a processor adapted to run user applications and interact with the memory, the radio and the user interface and adapted to run applications, the user equipment characterized by having means for: monitoring whether the user equipment has transitioned to a network that supports concurrent voice and data; and performing, upon said means for monitoring detecting the transition, a routing area update.

Figure 1:
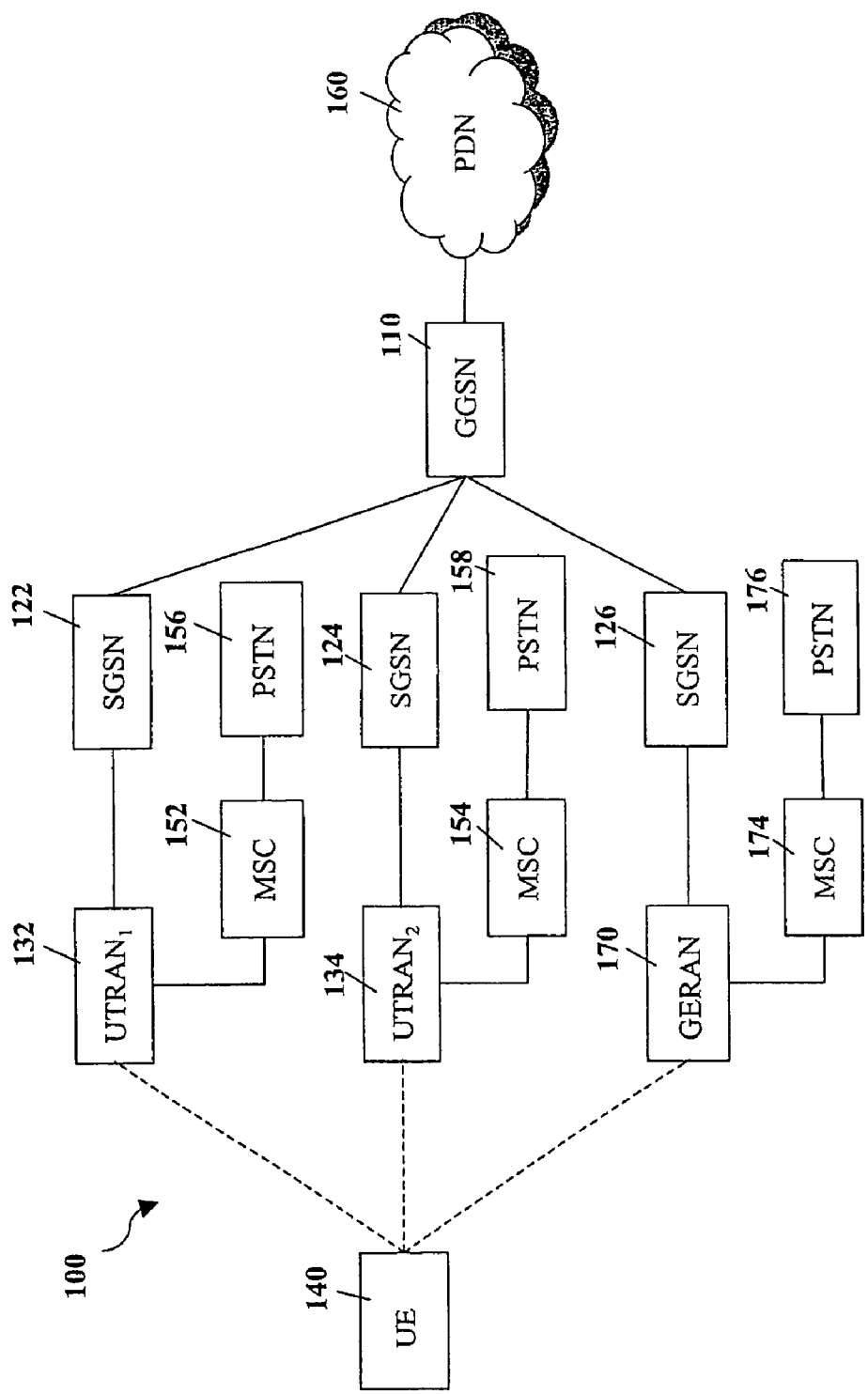
FIG. 1 is a block diagram of an exemplary network for use in association with the present method and apparatus.

Reference is now made to FIG. 1. FIG. 1 illustrates a simplified block diagram of a network 100 showing a gateway GPRS support node (GGSN) 110 communicating with various service GPRS support notes (SGSN) 122, 124 and 126 respectively.

As illustrated in FIG. 1, SGSN 122 and SGSN 124 are part of a universal mobile telecommunications system (UMTS) network. A UMTS network is a broadband, packet based network for the transmission of text, digitized voice, video and multi-media. It is a highly subscribed standard for third generation and is generally based on wideband coded divisional multiple access (W-CDMA).

SGSN 122 communicates with a UMTS terrestrial radio access node (UTRAN) 132. User equipment 140 communicates through UTRAN 132, SGSN 122, GGSN 110 and ultimately to a packet data network (PDN) 160.

Similarly, user equipment 140 could communicate with UTRAN 134, which communicates with SGSN 124.

For circuit switched communications, user equipment 140 can communicate through UTRAN 132 or UTRAN 134 to mobile switching centre (MSC) 152 and 154 respectively. MSC 152 and MSC 154 communicate with public switched telephone networks (PSTN) 156 and 158 respectively.

As will be appreciated by those skilled in the art, a UMTS network is a third generation network that supports concurrent voice and data. Data travels from the packet data network 160 through GGSN 110 and through either SGSN 122 or 124 to UTRAN 132 or 134 and ultimately to the user equipment 140. Voice or circuit switched communications are routed through the PSTN 156 or 158, through MSC 152 or 154, through UTRAN 132 or 134 and to user equipment 140.

Figure 2:
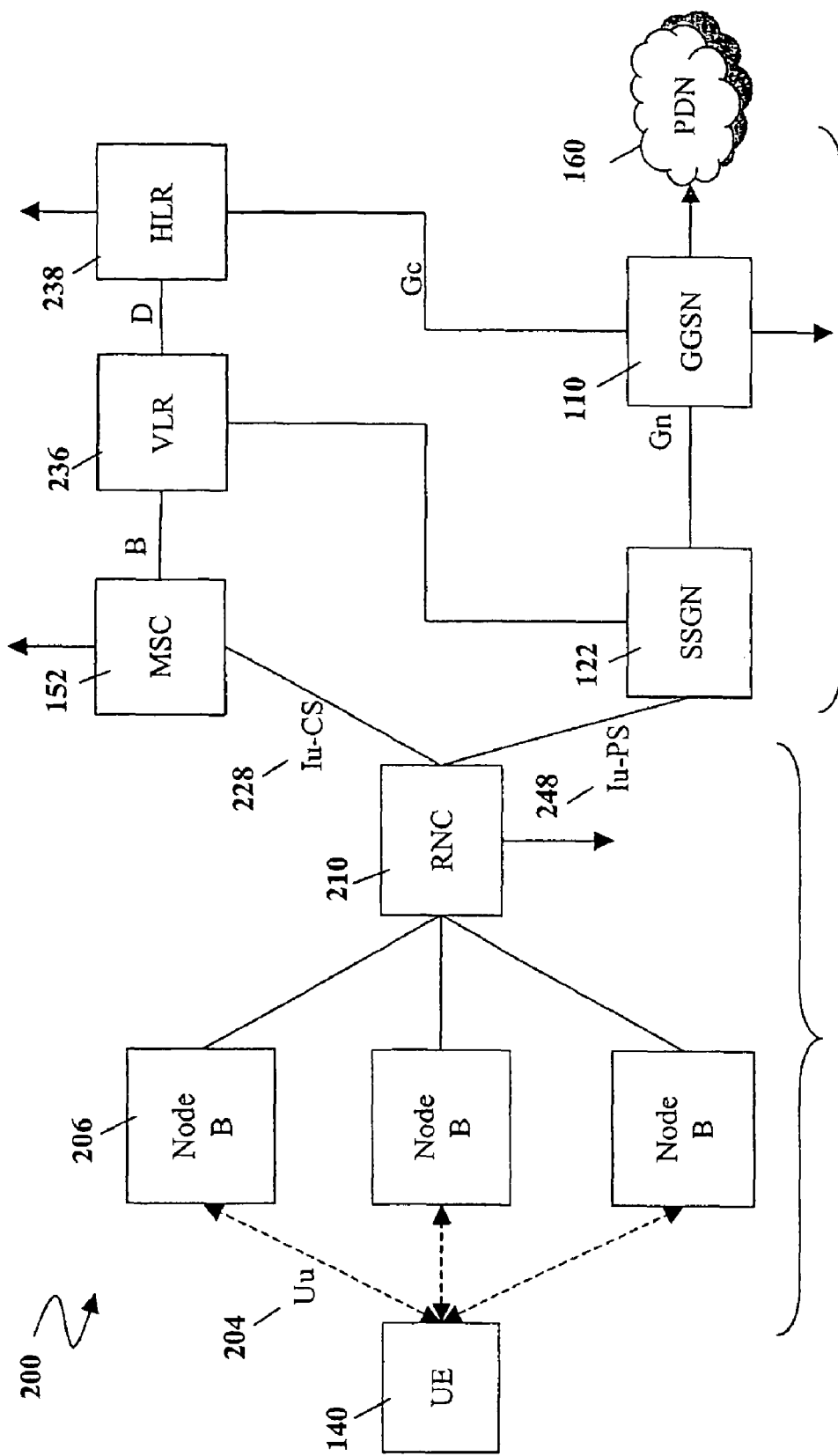
FIG. 2 is a block diagram of the UMTS networks of FIG. 1.

A more detailed description of a UMTS network is illustrated in FIG. 2. FIG. 2 is a block diagram of a communication system 200. Similar numbering will be used for similar components between FIGS. 1 and 2.

Communications system 200 includes a UE 140 which communicates through a wireless communication network. UE 140 communicates wirelessly with one of multiple Node Bs 206. Each Node B 206 is responsible for air interface processing and some radio resource management functions. Node B 206 provides functionality similar to a Base Transceiver Station in a GSM/GPRS networks.

The wireless link shown in communication system 200 of FIG. 2 represents one or more different channels, typically different radio frequency (RF) channels, and associated protocols used between the wireless network and UE 140. A Uu air interface 204 is used between UE 202 and Node B 206.

An RF channel is a limited resource that must be conserved, typically due to limits in overall bandwidth and a limited battery power of UE 140. Those skilled in art will appreciate that a wireless network in actual practice may include hundreds of cells depending upon desired overall expanse of network coverage. All pertinent components may be connected by multiple switches and routers (not shown), controlled by multiple network controllers.

Each Node B 206 communicates with a radio network controller (RNC) 210. The RNC 210 is responsible for control of the radio resources in its area. One RNC 210 controls multiple Node Bs 206.

The RNC 210 in UMTS networks provides functions equivalent to the Base Station Controller (BSC) functions in GSM/GPRS networks. However, an RNC 210 includes more intelligence including, for example, autonomous handovers management without involving MSCs and SGSNs.

The interface used between Node B 206 and RNC 210 is an Iub interface 208. An NBAP (Node B application part) signaling protocol is primarily used, as defined in 3GPP TS 25.433 V3.11.0 (2002-09) and 3GPP TS 25.433 V5.7.0 (2004-01).

Universal Terrestrial Radio Access Network (UTRAN) 132 comprises the RNC 210, Node B 206 and the Uu air interface 204.

Circuit switched traffic is routed to Mobile Switching Centre (MSC) 152. MSC 152 is the computer that places the calls, and takes and receives data from the subscriber or from PSTN (not shown).

Traffic between RNC 210 and MSC 152 uses the Iu-CS interface 228. Iu-CS interface 228 is the circuit-switched connection for carrying (typically) voice traffic and signaling between UTRAN 132 and the core voice network. The main signaling protocol used is RANAP (Radio Access Network Application Part). The RANAP protocol is used in UMTS signaling between the Core Network 221, which can be a MSC 152 or SSGN 122 (defined in more detail below) and UTRAN 132. RANAP protocol is defined in 3GPP TS 25.413 V3.11.1 (2002-09) and TS 25.413 V5.7.0 (2004-01).

For all UEs 140 registered with a network operator, permanent data (such as UE 102 user's profile) as well as temporary data (such as UE's 140 current location) are stored in a home location registry (HLR) 238. In case of a voice call to UE 140, HLR 238 is queried to determine the current location of UE 140. A Visitor Location Register (VLR) 236 of MSC 152 is responsible for a group of location areas and stores the data of those mobile stations that are currently in its area of responsibility. This includes parts of the permanent mobile station data that have been transmitted from HLR 238 to the VLR 236 for faster access. However, the VLR 236 of MSC 152 may also assign and store local data, such as temporary identifications. UE 140 is also authenticated on system access by HLR 238.

Packet data is routed through Service GPRS Support Node (SGSN) 122. SGSN 122 is the gateway between the RNC and the core network in a GPRS/UMTS network and is responsible for the delivery of data packets from and to the UEs within its geographical service area. Iu-PS interface 248 is used between the RNC 210 and SGSN 122, and is the packet-switched connection for carrying (typically) data traffic and signaling between the UTRAN 132 and the core data network. The main signaling protocol used is RANAP (described above).

The SSGN 122 communicates with the Gateway GPRS Support Node (GGSN) 110. GGSN 110 is the interface between the UMTS/GPRS network and other networks such as the Internet or private networks. GGSN 110 is connected to a public data network PDN 160 over a Gi interface.

Those skilled in art will appreciate that wireless network may be connected to other systems, possibly including other networks, as shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

As further illustrated in FIG. 1, a GSM edge radio access network (GERAN) 170 communicates with user equipment 140. GERAN 170 communicates through an SGSN 126 to GGSN 110.

GERAN 170 further communicates with an MSC 174 and PSTN 176 for circuit switched communications.

GERAN 170 is an example of a GPRS system with enhanced data rates for data. However, for Class B GPRS operation, concurrent voice and packet data services are not supported. Since voice services take precedence over data services in class B GPRS operation, GPRS packet data services are suspended when user initiates a voice call or takes an incoming voice call.

Figure 3:
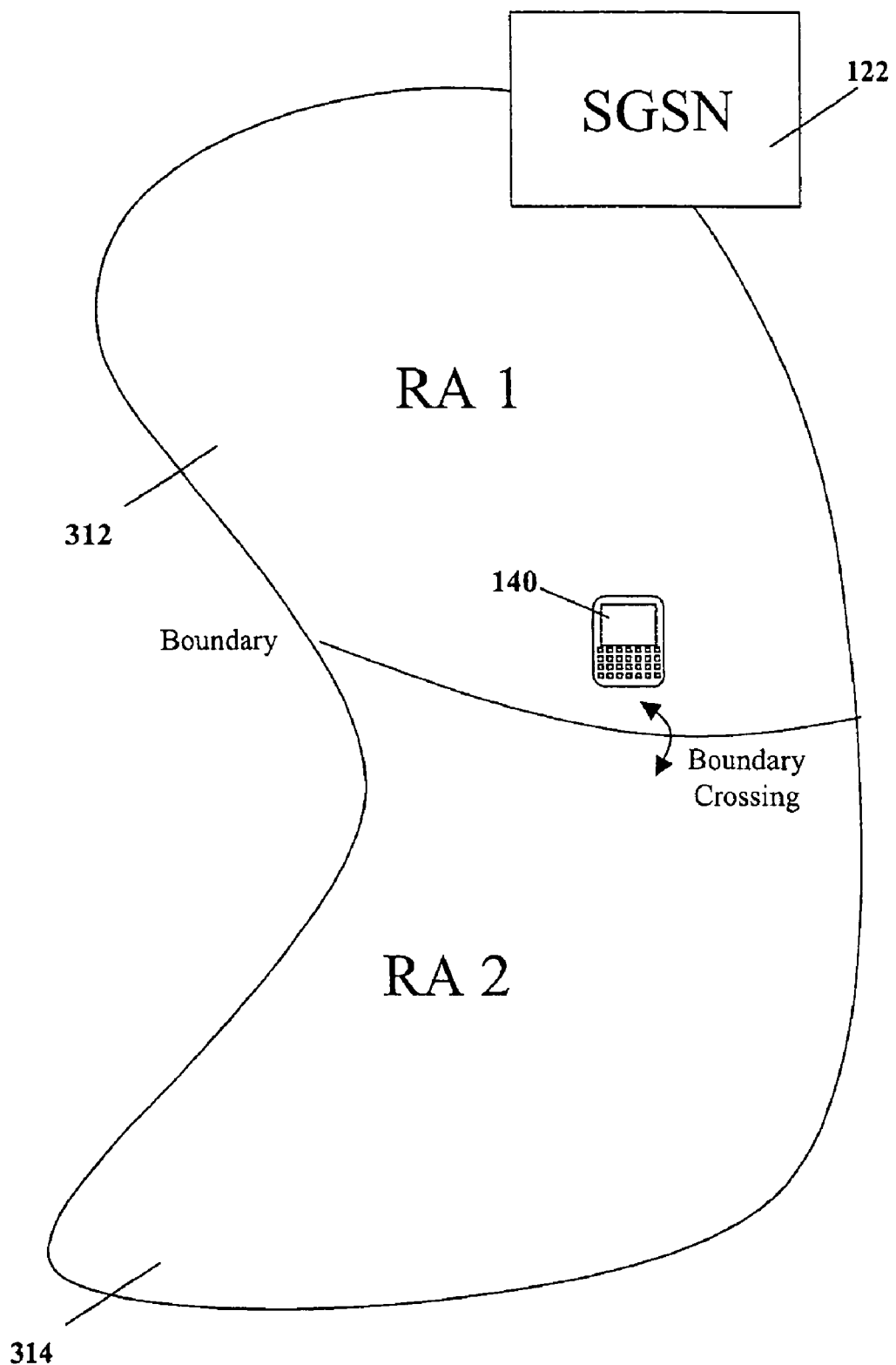
FIG. 3 is a schematic diagram showing routing areas being controlled by an SGSN.

Reference is now made to FIG. 3. As will be appreciated by those skilled in the art, a Location Area Code (LAC) is a fixed length code (of 2 octets) identifying a location area within a Public Land Mobile Network (PLMN). The LAI is composed of Mobile Country Code (MCC), Mobile Network Code (MNC) and LAC.

A Routing Area Code (RAC) is a fixed length code (of 1 octet) identifying a routing area within a location area. The routing area identity (RAI) is composed of the LAI and the routing area code. RAI is typically used for packet data service registration.

As illustrated in FIG. 3, a SGSN 122 can include one or more routing areas associated therewith. In the case of FIG. 3, two routing areas are illustrated, namely routing areas 312 and 314.

User equipment 140 is responsible to keep SGSN 122 informed of its current routing area to facilitate communication with user equipment 140.

Always on user equipment 140 is expected to maintain packet data connectivity at all times. Further, because it is an always on device, user equipment 140 will prefer to be in a network that supports both voice and data concurrently rather than in a network which only supports one or the other. Thus, user equipment 140 will continually be checking to see whether it can connect to a network that supports both voice and data concurrently.

In one example, user equipment 140 is a GSM/UMTS dual mode UE which is required to perform GSM/UMTS re-selection or handovers at cell boundaries or as directed by the network.

Referring again to FIG. 1, user equipment 140 could be connected to GERAN 170 and receiving data through SGSN 126. When a voice call is made to user equipment 140, it is routed through MSC 174 to GERAN 170 and to UE 140. Any data being sent from PDN 160 is suspended during the voice call.

If, during the voice call, a handover occurs to a UMTS network, the voice call is switched to, for example, MSC 154 and continues. In some networks, MSC can be shared between GSM and UMTS. For data, however, the switch from the GSM to the UMTS network may not cause any instant trigger or outbound user data on user equipment 140 that would force the UE to send a routing area update message. The data reconnection may not occur until the voice call ends.

According to 3GPP TS 24.008 specifications:

> After the successful completion of the handover from a GSM cell to a UMTS cell, a MS which has performed the GPRS suspension procedure in a Gb mode (C3GPP TS 04.18) (i.e. a MS in MS operation mode B or a DTM MS in a GSM cell that does not support DTM) shall perform a normal RA update procedure in the UMTS cell in order to resume the GPRS services in the network, before sending any other signaling message or user data".

The standard therefore requires that before any data is sent, a routing area update procedure must be performed. However, after a successful completion of voice handover, there may not be any user data to be sent. As a result, a packet data session that was suspended when the call was initiated in GSM or due to handover to GSM may not resume until the voice call ends in UMTS. In such a case, user equipment 140 will not be reachable from a packet data perspective even after it has entered a network that supports concurrent voice and data.

If there is no ongoing voice call, a transition may still not cause a routing area update to occur right away. For example, it is possible that a device may perform a reselection from a GPRS to a UMTS network within the same routing area. Pursuant to 3GPP specifications, there is no need to do an update if the routing area stays the same and is in PMM-IDLE mode in UMTS until there is some user data to send. According to section 4.7.17 of 3GPP TS 24.008:

> If the READY timer is not running in the MS in GSM or the MS is in PMM-IDLE mode in UMTS, then the MS shall not perform a RA update procedure (as long as the MS stays within the same RA) until up-link user data or signaling information needs to be sent from the MS to the network.

The above therefore shows that if the device is in a PMM-IDLE mode, no RA update procedure is performed until user data is to be sent from the user equipment 140.

However, when a transition occurs between a GPRS and a UMTS, packet data protocol (PDP) contexts may change. It is quite possible that the number of concurrent primary PDP contexts supported by UMTS networks is different from GPRS networks. Most UMTS networks support only one or a maximum of two concurrent PDP contexts whereas GPRS networks support more than that. An Always-on device needs to restore its most important PDP contexts, such as the PDP context associated with a push server, as soon as the network support of concurrent voice and packet data service is available. The transition from a GPRS network or networks that do not support both voice and data concurrently to a network which does support both voice and data concurrently such as a UMTS network may lead to the PDP context changing. In addition, the IP address could also change in a transition between the GPRS and UMTS networks.

Figure 4:
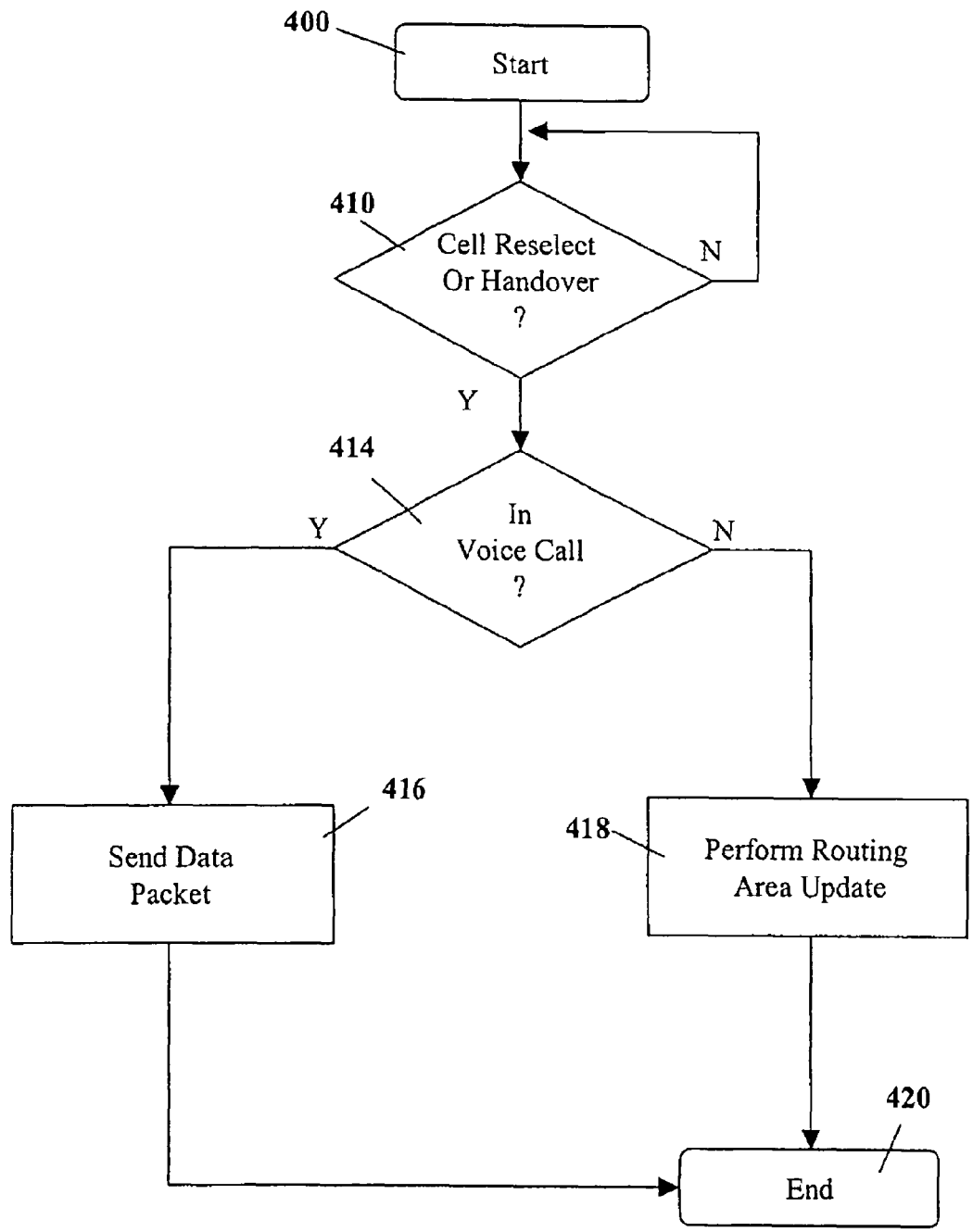
FIG. 4 is a flow chart showing a preferred method.

Reference is now made to FIG. 4. FIG. 4 illustrates a flow chart of a preferred method according to the present disclosure. In FIG. 4, a process starts at step 410. The process is run on user equipment such as user equipment 140 of FIG. 1.

The process checks, in step 410, whether a cell reselection or handover had occurred. As will be appreciated by those skilled in the art, the handover could be between networks that do not support concurrent voice and data to networks that support concurrent voice and data. However, it will be appreciated by those skilled in the art that any transition to a network that supports both voice and data is contemplated by the present method. Thus if a transition occurs between two networks that both support concurrent voice and data, the present method will also apply.

If no cell reselection or handover has occurred in step 410, the process continues to monitor whether a handover has occurred.

Conversely, if a cell reselection or handover has occurred, the process proceeds to step 414 in which user equipment 140 checks whether it is in a voice call. As will be appreciated, if the user equipment is in a voice call, a different action may need to be taken than if the user equipment 140 is performing an idle handover or cell reselection.

If in a voice call and since the user equipment 140 is now in a network that supports both concurrent voice and data, the process proceeds to step 416 in which a small data packet is sent to an always-on push server. This occurs right after the handover of the voice call. The outbound data forces the user equipment 140 to send a routing area update and by doing so the mobile finds out whether there is any change in existing PDP contexts. This could, for example, include a change in the quality of service, if any, or PDP address. The preferred PDP contexts are also thereby restored by sending the data packet in step 416.

If the check in step 414 found that the user equipment 140 was not in a voice call, or cell reselection has occurred and the process proceeds to step 418. In step 418, user equipment 140 performs a routing area update with PDP status information. Step 418 thereby provides for the maintenance of packet data connectivity as soon as a handover is complete. The process next proceeds to step 420 and ends.

The method as outlined in FIG. 4, therefore, sends control data to a push server immediately after an inter-routing area transfer, handover or cell reselection regardless of whether the location area or routing area has changed and regardless of whether the UE has any outbound user-data.

As will be appreciated by those skilled in the art, implementation of the method of FIG. 4 could be separated into a process for the handover during a voice call and a process for causing a routing area update during and idle transition or cell reselection. These two processes can be independent of each other, and one can be used with or without the other. Thus user equipment 140, in one embodiment, could implement the sending of a small data packet on transition during a voice call, but not implement the routing area update on idle transition or cell reselection, and vice versa.

Figure 5:
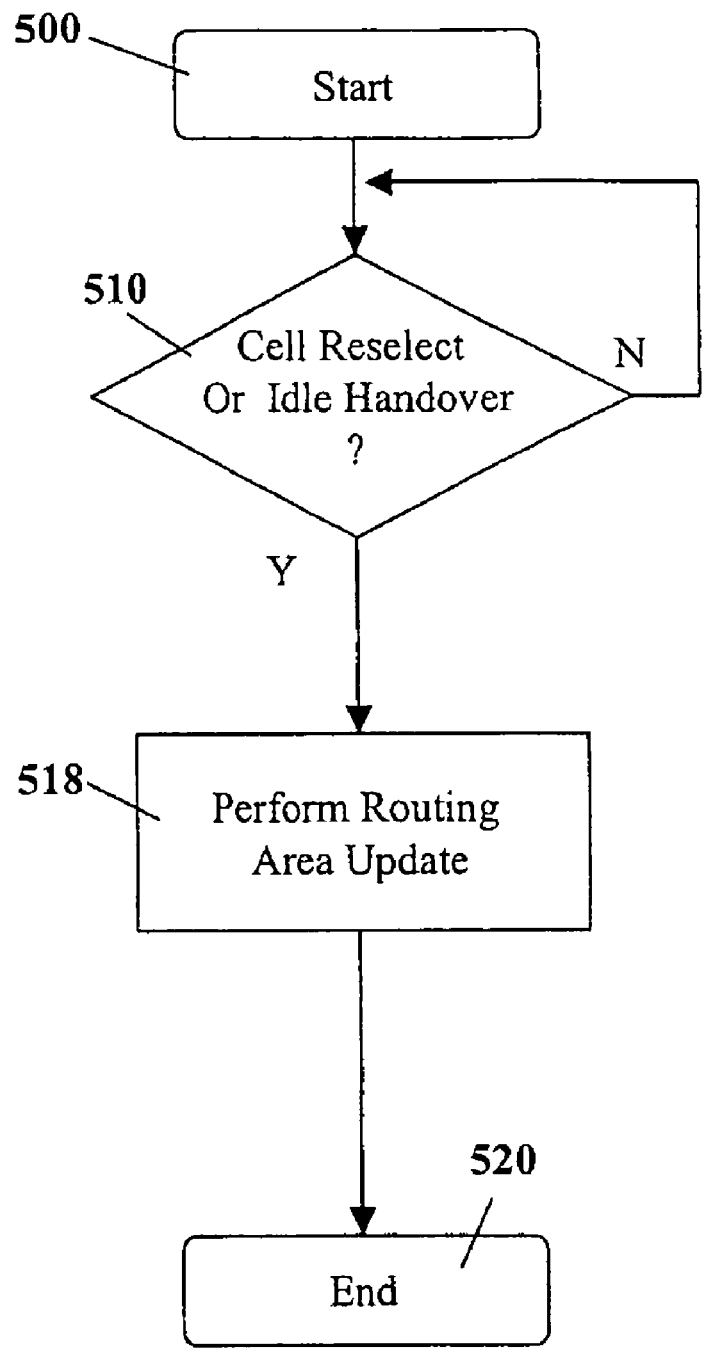
FIG. 5 is a flow chart showing a method of maintaining data connectivity during an idle handover or cell reselection.

Reference is now made to FIG. 5. FIG. 5 is a flow chart showing the process for the maintenance of data connectivity during an idle handover or cell reselection. The process of FIG. 5 starts in step 500 and proceeds to step 510 in which it checks whether a cell reselection or idle handover has occurred. If no cell reselection or idle handover has occurred, then the process remains in step 510 until the cell reselection or idle handover has occurred.

Once a cell reselection or idle handover has occurred, the process proceeds to step 518 in which a routing area update is performed. The routing area update includes PDP status information as described above with reference to step 418 of FIG. 4.

The process then ends in step 520.

Figure 6:
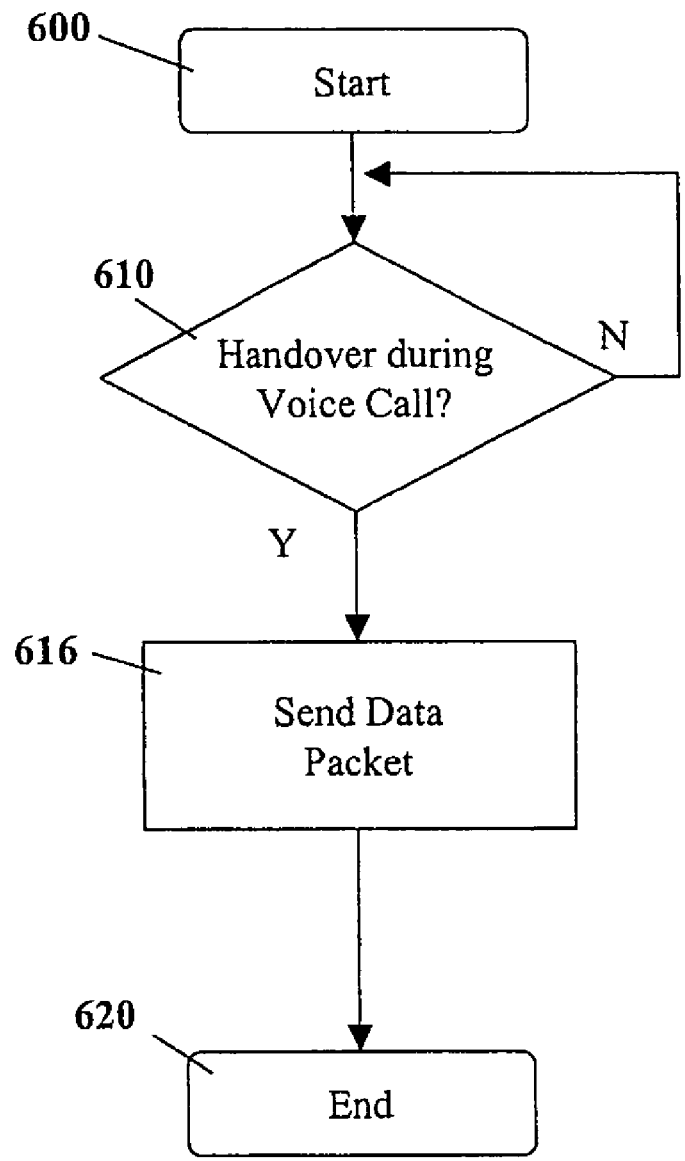
FIG. 6 is a flow chart showing a method of restore data connectivity in a transition during a voice call.

Referring to FIG. 6, FIG. 6 shows a process for a handover during a voice call. The process starts in step 600 and proceeds to step 610 in which it checks whether a handover has occurred during a voice call. If the handover has not occurred during voice call, the process stays in 610 until a handover does occur.

Once a handover occurs in step 610, the process proceeds to step 616 in which a data packet is sent. As with step 416 of FIG. 4, the data packet being sent from user equipment 140 triggers a routing area update and by doing so the mobile finds out whether or not there has been any change in existing PDP contexts. The preferred PDP contexts are thereby restored through the sending of a data packet in steps 616.

The process then proceeds to step 620 and ends.

Figure 7:
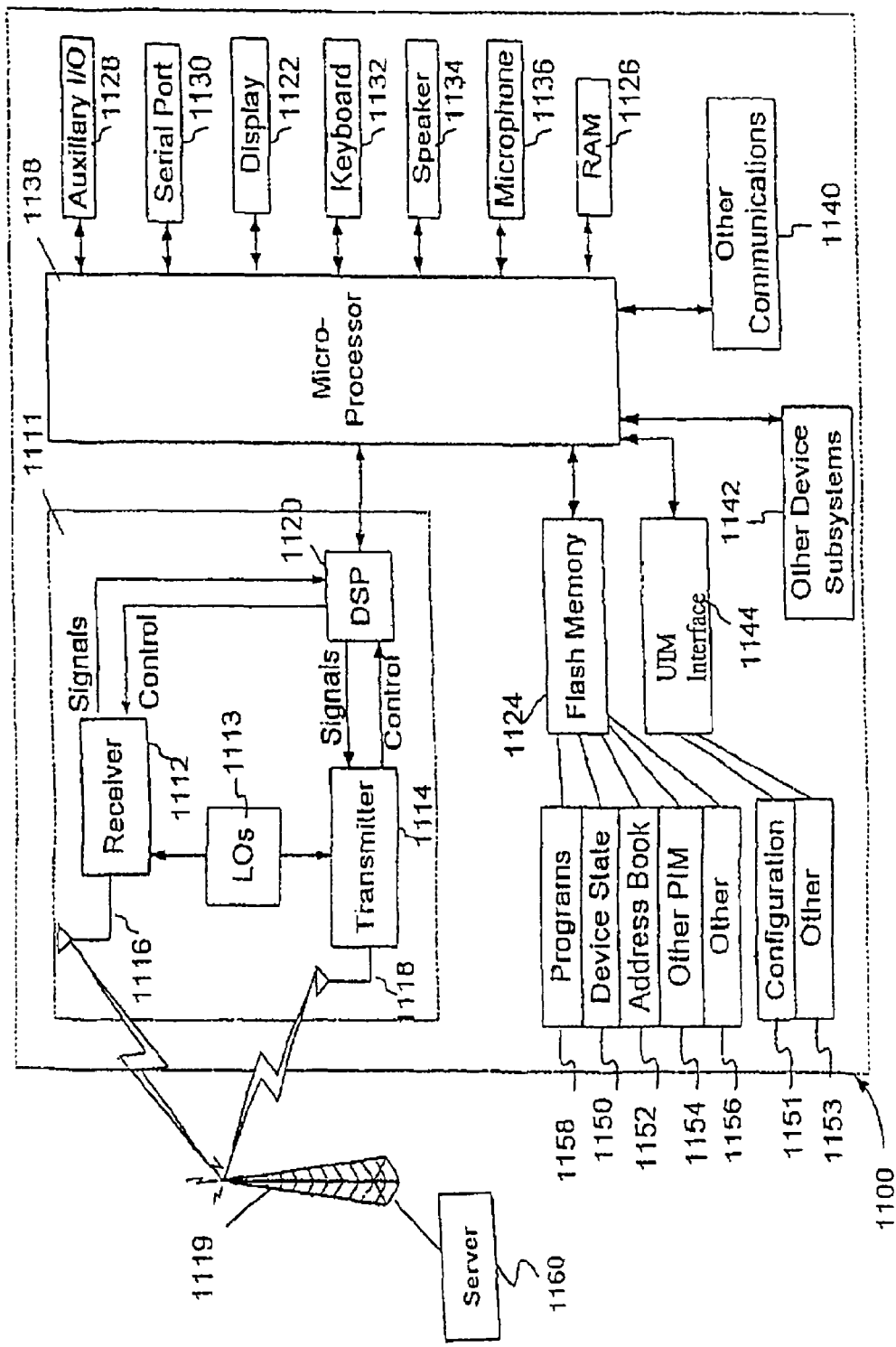
FIG. 7 is a block diagram showing exemplary user equipment that can be used in association with the present apparatus and method.

The above could be implemented on any user equipment that is dual mode operable. Referring to FIG. 7, FIG. 7 illustrates one exemplary UE that can be used with the above method.

UE 1100 is preferably a two-way wireless communication device having at least voice and data communication capabilities, and can be UE 140 of FIGS. 1, 2 and 3. UE 1100 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where UE 1100 is enabled for two-way communication, it will incorporate a communication subsystem 1111, including both a receiver 1112 and a transmitter 1114, as well as associated components such as one or more, preferably embedded or internal, antenna elements 1116 and 1118, local oscillators (LOs) 1113, and a processing module such as a digital signal processor (DSP) 1120. As will be apparent to those skilled in the field of communications, the particular design of the communication subsystem 1111 will be dependent upon the communication network in which the device is intended to operate. For example, UE 1100 may include a communication subsystem 1111 designed to operate within the GPRS network or UMTS network.

Network access requirements will also vary depending upon the type of network 1119. For example, In UMTS and GPRS networks, network access is associated with a subscriber or user of UE 1100. For example, a GPRS mobile device therefore requires a subscriber identity module (SIM) card in order to operate on a GPRS network. In UMTS a USIM or SIM module is required. In CDMA a RUIM card or module is required. These will be referred to as a UIM interface herein. Without a valid UIM interface, a mobile device may not be fully functional. Local or non-network communication functions, as well as legally required functions (if any) such as emergency calling, may be available, but mobile device 1100 will be unable to carry out any other functions involving communications over the network 1100. The UIM interface 1144 is normally similar to a card-slot into which a card can be inserted and ejected like a diskette or PCMCIA card. The UIM card can have approximately 64K of memory and hold many key configuration 1151, and other information 1153 such as identification, and subscriber related information.

When required network registration or activation procedures have been completed, UE 1100 may send and receive communication signals over the network 1119. Signals received by antenna 1116 through communication network 1119 are input to receiver 1112, which may perform such common receiver functions as signal amplification, frequency down conversion, filtering, channel selection and the like, and in the example system shown in FIG. 7, analog to digital (A/D) conversion. A/D conversion of a received signal allows more complex communication functions such as demodulation and decoding to be performed in the DSP 1120. In a similar manner, signals to be transmitted are processed, including modulation and encoding for example, by DSP 1120 and input to transmitter 1114 for digital to analog conversion, frequency up conversion, filtering, amplification and transmission over the communication network 1119 via antenna 1118. DSP 1120 not only processes communication signals, but also provides for receiver and transmitter control. For example, the gains applied to communication signals in receiver 1112 and transmitter 1114 may be adaptively controlled through automatic gain control algorithms implemented in DSP 1120.

Network 1119 may further communicate with multiple systems, including a server 1160 and other elements (not shown). For example, network 1119 may communicate with both an enterprise system and a web client system in order to accommodate various clients with various service levels.

UE 1100 preferably includes a microprocessor 1138 which controls the overall operation of the device. Communication functions, including at least data communications, are performed through communication subsystem 1111. Microprocessor 1138 also interacts with further device subsystems such as the display 1122, flash memory 1124, random access memory (RAM) 1126, auxiliary input/output (I/O) subsystems 1128, serial port 1130, keyboard 1132, speaker 1134, microphone 1136, a short-range communications subsystem 1140 and any other device subsystems generally designated as 1142.

Some of the subsystems shown in FIG. 7 perform communication-related functions, whereas other subsystems may provide "resident" or on-device functions. Notably, some subsystems, such as keyboard 1132 and display 1122, for example, may be used for both communication-related functions, such as entering a text message for transmission over a communication network, and device-resident functions such as a calculator or task list.

Operating system software used by the microprocessor 1138 is preferably stored in a persistent store such as flash memory 1124, which may instead be a read-only memory (ROM) or similar storage element (not shown). Those skilled in the art will appreciate that the operating system, specific device applications, or parts thereof, may be temporarily loaded into a volatile memory such as RAM 1126. Received communication signals may also be stored in RAM 1126. Further, a unique identifier is also preferably stored in read-only memory.

As shown, flash memory 1124 can be segregated into different areas for both computer programs 1158 and program data storage 1150, 1152, 1154 and 1156. These different storage types indicate that each program can allocate a portion of flash memory 1124 for their own data storage requirements. Microprocessor 1138, in addition to its operating system functions, preferably enables execution of software applications on the mobile device. A predetermined set of applications that control basic operations, including at least data and voice communication applications for example, will normally be installed on UE 1100 during manufacturing. A preferred software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 1119. In a preferred embodiment, the PIM data items are seamlessly integrated, synchronized and updated, via the wireless network 1119, with the mobile device user's corresponding data items stored or associated with a host computer system. Further applications may also be loaded onto the mobile device 1100 through the network 1119, an auxiliary I/O subsystem 1128, serial port 1130, short-range communications subsystem 1140 or any other suitable subsystem 1142, and installed by a user in the RAM 1126 or preferably a non-volatile store (not shown) for execution by the microprocessor 1138. Such flexibility in application installation increases the functionality of the device and may provide enhanced on-device functions, communication-related functions, or both. For example, secure communication applications may enable electronic commerce functions and other such financial transactions to be performed using the UE 1100. These applications will however, according to the above, in many cases need to be approved by a carrier.

In a data communication mode, a received signal such as a text message or web page download will be processed by the communication subsystem 1111 and input to the microprocessor 1138, which preferably further processes the received signal for output to the display 1122, or alternatively to an auxiliary I/O device 1128. A user of UE 1100 may also compose data items such as email messages for example, using the keyboard 1132, which is preferably a complete alphanumeric keyboard or telephone-type keypad, in conjunction with the display 1122 and possibly an auxiliary I/O device 1128. Such composed items may then be transmitted over a communication network through the communication subsystem 1111.

For voice communications, overall operation of UE 1100 is similar, except that received signals would preferably be output to a speaker 1134 and signals for transmission would be generated by a microphone 1136. Alternative voice or audio I/O subsystems, such as a voice message recording subsystem, may also be implemented on UE 1100. Although voice or audio signal output is preferably accomplished primarily through the speaker 1134, display 1122 may also be used to provide an indication of the identity of a calling party, the duration of a voice call, or other voice call related information for example.

Serial port 1130 in FIG. 7 would normally be implemented in a personal digital assistant (PDA)-type mobile device for which synchronization with a user's desktop computer (not shown) may be desirable. Such a port 1130 would enable a user to set preferences through an external device or software application and would extend the capabilities of mobile device 1100 by providing for information or software downloads to UE 1100 other than through a wireless communication network. The alternate download path may for example be used to load an encryption key onto the device through a direct and thus reliable and trusted connection to thereby enable secure device communication.

Alternatively, serial port 1130 could be used for other communications, and could include as a universal serial bus (USB) port. An interface is associated with serial port 1130.

Other communications subsystems 1140, such as a short-range communications subsystem, is a further optional component which may provide for communication between UE 1100 and different systems or devices, which need not necessarily be similar devices. For example, the subsystem 1140 may include an infrared device and associated circuits and components or a Bluetooth™ communication module to provide for communication with similarly enabled systems and devices.

The embodiments described herein are examples of structures, systems or methods having elements corresponding to elements of the techniques of this disclosure. This written description may enable those skilled in the art to make and use embodiments having alternative elements that likewise correspond to the elements of the techniques of this disclosure. The intended scope of the techniques of this disclosure thus includes other structures, systems or methods that do not differ from the techniques of this disclosure as described herein, and further includes other structures, systems or methods with insubstantial differences from the techniques of this disclosure as described herein.

We claim:

1. A method to restore a suspended packet switched service to user equipment in a network that supports concurrent voice and data, the method comprising the steps of:
   detecting whether the user equipment is transitioning from a first network that does not support concurrent voice and data and in which a packet switched service is suspended to a second network that supports said concurrent voice and data; and
   upon detecting that the user equipment is in a voice call during the transition and without reference to routing area or location information, sending a data packet by the user equipment to the second network before a routing area update has occurred, the sending of the data packet for forcing said routing area update to be performed, for restoring the suspended packet switched service.

2. The method of claim 1, wherein the method further comprises the step of restoring preferred PDP contexts for the user equipment.

3. The method of claim 1, wherein said sending step occurs immediately after said transition.

4. The method of claim 1, wherein the user equipment is operable in both the second network that supports concurrent voice and data and the first network, the first network being further characterized in that the first network does not support concurrent voice and data.

5. The method of claim 4, wherein the second network that supports concurrent voice and data is a UMTS network.

6. The method of claim 4, wherein the first network that does not support concurrent voice and data is a GPRS network.

7. The method of claim 6, wherein the detecting step detects a transition between the first network that does not support concurrent voice and data to the second network that supports concurrent voice and data.

8. The method of claim 7, wherein both the second network that supports concurrent voice and data and the first network that does not support concurrent voice and data have the same routing area.

9. The method of claim 8, wherein said second network that supports concurrent voice and data includes a first set of PDP contexts and the first network that does not support concurrent voice and data includes a second set of PDP contexts, wherein the first set of PDP contexts is different from the second set of PDP contexts.

10. The method of claim 9, wherein the first set of PDP contexts includes fewer PDP contexts than the second set of PDP contexts.

11. Always-on user equipment configured to restore a suspended packet switched service during handover to a network, the network supporting concurrent voice and data the user equipment having a radio subsystem including a radio configured to communicate with the mobile network; a radio processor having a digital signal processor and configured to interact with said radio subsystem; memory; a user interface; a processor configured to run user applications and interact with the memory, the radio and the user interface and configured to run applications, the user equipment further configured to:

detect whether the user equipment is transitioning from a first network that does not support concurrent voice and data and in which a packet switched service is suspended to a second network that supports said concurrent voice and data; and upon detecting that the user equipment is in a voice call during the transition and without reference to routing area or location information, send a data packet by the user equipment to the second network before a routing area update has occurred, the sending of the data packet for forcing said routing area update to be performed, to restore the suspended packet switched service.

12. The user equipment of claim 11, further configured to restore preferred PDP contexts for the user equipment.

13. The user equipment of claim 11, wherein the second network that supports concurrent voice and data is a UMTS network.

14. The user equipment of claim 11, wherein the user equipment is operable in both the second network that supports concurrent voice and data and the first network, the first network being further characterized in that the first network does not support concurrent voice and data.

15. The user equipment of claim 14, wherein the first network that does not support concurrent voice and data is a GPRS network.

16. The user equipment of claim 14, wherein the user equipment is further configured to detect a transition between the first network that does not support concurrent voice and data to the second network that supports concurrent voice and data.

17. The user equipment of claim 16, wherein said second network that supports concurrent voice and data includes a first set of PDP contexts and the first network that does not support concurrent voice and data includes a second set of PDP contexts, wherein the first set of PDP contexts is different from the second set of PDP contexts.

18. The user equipment of claim 17, wherein the first set of PDP contexts includes fewer PDP contexts than the second set of PDP contexts.

* * * * *